P. WEIFENBACH.
EGG HANDLING DEVICE.
APPLICATION FILED JUNE 2, 1910.

987,780.

Patented Mar. 28, 1911.

2 SHEETS—SHEET 1.

Witnesses:
C. M. Albee.
Bernice Briggs

Inventor:
Philip Weifenbach
By G. H. Albee.
Attorney.

P. WEIFENBACH.
EGG HANDLING DEVICE.
APPLICATION FILED JUNE 2, 1910.
987,780.
Patented Mar. 28, 1911.
2 SHEETS—SHEET 2.
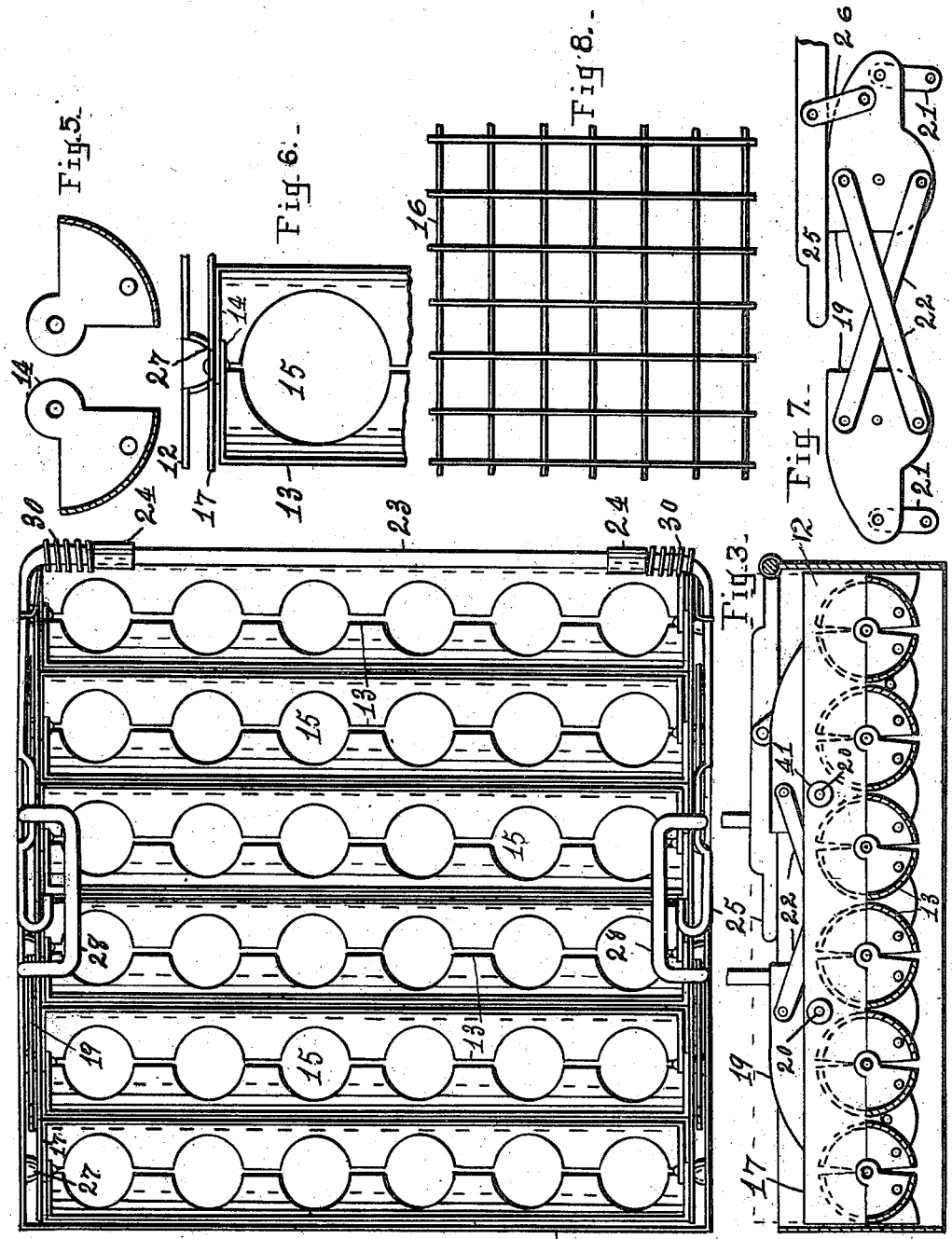
WITNESSES:
INVENTOR.
Philip Weifenbach.
BY
ATTORNEY.

UNITED STATES PATENT OFFICE.

PHILIP WEIFENBACH, OF KAUKAUNA, WISCONSIN.

EGG-HANDLING DEVICE.

987,780.

Specification of Letters Patent. Patented Mar. 28, 1911.

Application filed June 2, 1910. Serial No. 564,598.

*To all whom it may concern:*

Be it known that I, PHILIP WEIFENBACH, a citizen of the United States, residing at Kaukauna, in the county of Outagamie and State of Wisconsin, have invented a new and useful Egg-Handling Device, of which the following is a specification.

My invention relates to an egg handling device for placing the eggs in the egg seats of a testing device and removing them therefrom and then dropping the eggs from the handling device simultaneously into the usual paper egg crate, without the handling of the eggs individually, after once being placed in the handling device. The utensils and mechanism for doing this are shown in the accompanying drawings, in which,—

Figure 4:
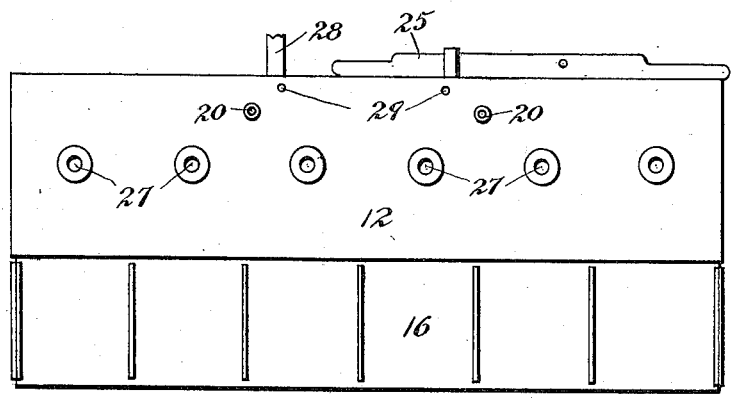
Figure 9:
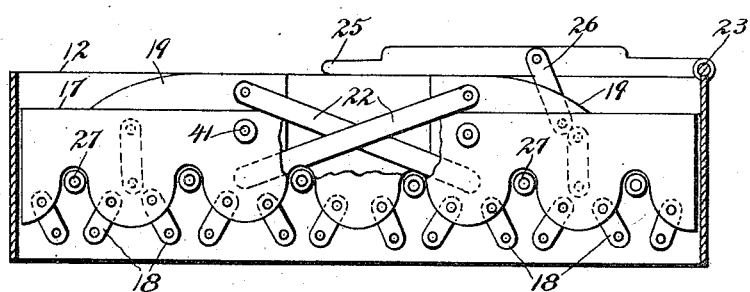
Figure 1:
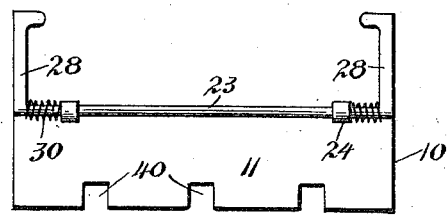

Figure 1 is a side elevation of the egg handling device. Fig. 2 is a plan of the egg handling device. Fig. 3 is a transverse vertical section of Fig. 6. Fig. 4 is an end view of the handling device with its handles broken, and a paper egg crate below it. Fig. 5 is an end view of the two wings, separated, which form a pair of egg holders in the handling device. Fig. 6 is a plan showing a short section of a pair of wings, as in Fig. 9, pivoted to the outside end wall of the handler. Fig. 7 is a side elevation of two levers which are used at each end of the handling inclosure for operating the vertically movable plate shown in Figs. 7, 10 and 13, which operates the wings shown in Figs. 9 and 10. Fig. 8 is a plan of a paper egg crate of commerce. Fig. 9 is an elevation of the inside end wall of the handler with a vertically movable plate inside of said end wall, said plate being connected with the end wall by means of two links and a pair of short levers, said two levers being each pivoted to the end wall, and the vertically movable plate being connected by means of short links with all of the egg carrying wings. Figs. 1 and 8 are upon the same scale, Figs. 2, 3, 4, 7 and 9, upon a larger scale and Figs. 5 and 6 upon a still larger one.

Similar numerals indicate like parts in the several views.

For greater speed in testing and handling eggs, a handling device 10, has been invented for use in testing, it consisting of a rectangular inclosure of a size adapted to be placed over the usual paper egg crates, and being provided with seats for eggs corresponding in number and space occupied with the individual egg compartments of said paper egg crates.

Mechanism is provided for dumping the eggs in the handling device into the paper egg crates after they have been tested. The device comprises a four sided inclosure with side walls 11, and end walls 12, suitably secured together at their four corners, in the present case, the device is arranged to contain three dozen eggs for corresponding with the standard commercial paper egg crates. The eggs are held within the four walls upon twelve trough like pieces, or wings, 13, which are used in pairs and have their ends 14, bent at a right angle with the length of the wings and by which ends the two pieces of each pair are pivoted to the end walls 12. Each pair of wings is provided with egg seats 15, of a little greater diameter than those of the seats in any egg testing device with which it may be used. They will be supported upon said seats 9, and little or no light can shine through the opening around the eggs.

For dumping the eggs from their seats 15 into the paper egg crates 16, a plate of metal 17, is arranged inside of each end wall 12, and spaced from it. These plates are connected by short links 18, with the ends 14, of the wings 13, and by raising said plates vertically, the wings 13 are opened, as shown in dotted lines in Fig. 3, and when the device 10 is placed over an egg crate, all of the eggs can be dumped into the crate.

The plates are raised for dumping eggs as follows: Two pairs of short levers 19, are pivoted upon the end walls 12 at the points 20, each one of a pair being connected with the plate by means of a link 21. The levers 19 are connected in pairs by means of long links 22. Along and above one side wall, a rod 23, is journaled in keepers 24, the rod being bent at right angles at each end of said side wall and terminating in suitable handles 25 at each end of the rod. A portion of the rod between the angular bends and its ends may be flattened for providing greater width of surface upon it. At a suitable point near each end of the rod, a link 26, connects the rod with a lever 19. The raising of the rod handles will operate through the levers 19, links 21 and 22, and 18, to turn the wings 13, bottom side up, as is shown by their position in dotted lines in Fig. 3, and thereby dump all of the eggs simultaneously. As noted above, the plates 17 are spaced from the end walls 12, and said space is occupied by the short levers 19, and all of the links for operating the wings 13. The end walls 12, are each countersunk at the six points 27, slightly more than the space between the walls and plates 17, and the wings 13 are pivoted in pairs to the centers of said countersinks. The end walls are each provided with suitable handles 28, which are riveted at points 29, to said walls, they being bent inward over the inclosure 10 for convenience in handling the device and operating the dumping mechanism. At each corner of the rod 23, a spiral spring 30, is mounted, and is arranged for acting to return the wings to their normal position after the eggs have been dumped.

Notches 40, are formed in the walls 11, for permitting said walls to fit down upon an egg testing device with which the handling device is adapted to be used. The perforations 41, in the plate 17, are merely for access to the rivets upon which the levers 19, are mounted.

The operation of the device is as follows: Eggs are placed in the handling device by the operator with their smaller end down in the several egg seats, and it is then lifted and placed over the egg seats in any suitable egg testing device, and each egg examined relative to its quality. Then the device 10, with the eggs therein is to be carried and placed over a paper egg crate and the eggs dumped into it by operating the dumping mechanism, without their being individually handled during the test after once being placed in the handling device.

It will be observed that the wings 13 are formed of a thin sheet of metal, curved transversely of the wings for stiffening them, and that they are hinged to the end plates 12 at their ends, with no amount of space between the several pairs. This is essential for the purpose of providing space for the twelve wings across the inclosure and between the side walls 11, thereof, as it is necessary that the inside area of the inclosure corresponds substantially, with the area of the usual paper egg shipping crates of commerce.

Having described my invention and the manner of its operation, what I claim and desire to secure by Letters Patent, is,—

1. In an egg handling device, an inclosure comprising four walls formed into a rectangle of a size corresponding substantially with the size of the usual paper egg shipping crate of commerce, six pairs of wings arranged parallel with each other within said walls, each pair of wings being hinged by their ends to the end walls of the inclosure, six egg seats formed between the wings of each pair, and each wing being formed of a thin sheet of metal, curved transversely thereof into a nearly quarter circle, whereby, the twelve wings with three dozen eggs thereon will be provided with sufficient space between the walls of the inclosure for the swinging of the wings when supplied with eggs and for dumping said eggs, within the area bounded by the outer walls of the aforesaid shipping crate.

2. An egg handling device, consisting of a rectangular inclosure adapted to receive and hold eggs corresponding in number and position with the egg compartments of the egg shipping crate of commerce, six pairs of substantially quarter circle shaped wings hinged together at their ends upon the end walls of the inclosure, six egg seats formed between the members of each pair for supporting eggs, a vertically movable plate at each end of said pairs of wings, a link connecting the ends of each wing with a vertically movable plate, a pair of levers connected with the plates and pivoted to the end wall of the inclosure, a link connecting each lever of a pair with the vertically movable plate, suitable handles secured to each end wall of the inclosure by which it may be lifted, a rod mounted in suitable holders along one side wall edge of the inclosure, bent at right angles at each end of the inclosure and terminating under the handles of the inclosure, a link connecting said rod near each angular bend with one of each pair of levers aforesaid, whereby, by the raising of the free ends of said rod, the pairs of levers will be operated, the vertically movable plates raised and all of the egg holding wings opened for letting eggs held thereon to be simultaneously dumped from the inclosure, and springs arranged for acting upon said handle rod and returning the several pairs of wings to their normal position.

PHILIP WEIFENBACH.

Witnesses:
 CHAS. N. MARSH,
 J. W. BRUN.